US012366170B2

(12) United States Patent
Brandl et al.

(10) Patent No.: US 12,366,170 B2
(45) Date of Patent: Jul. 22, 2025

(54) FLOW BODY FOR A GAS TURBINE, GAS TURBINE, METHOD FOR MANUFACTURING A FLOW BODY FOR A GAS TURBINE, AND METHOD FOR REPAIRING A FLOW BODY OF A GAS TURBINE (71) Applicant: DOOSAN ENERBILITY CO., LTD., Changwon-si (KR)

(72) Inventors: Herbert Brandl, Baden (CH); Joerg Krueckels, Baden (CH); Ulrich Rathmann, Baden (CH); Willy Hofmann, Baden (CH)

(73) Assignee: Doosan Enerbility Co., Ltd., Changwon-si (KR)

( * ) Notice: Subject to any disclaimer, the term of this patent is extended or adjusted under 35 U.S.C. 154(b) by 0 days.

(21) Appl. No.: 18/408,739

(22) Filed: Jan. 10, 2024

(65) Prior Publication Data
US 2024/0376826 A1 Nov. 14, 2024

(30) Foreign Application Priority Data
May 12, 2023 (EP) .................................. 23173138

(51) Int. Cl.
*F01D 5/20* (2006.01)
*B33Y 10/00* (2015.01)
(Continued)

(52) U.S. Cl.
CPC ................ *F01D 5/20* (2013.01); *B33Y 10/00* (2014.12); *B33Y 80/00* (2014.12); *F01D 5/005* (2013.01);
(Continued)

(58) Field of Classification Search
CPC . F01D 5/20; F01D 5/187; F01D 5/005; F01D 5/147; F01D 5/186; F01D 5/18;
(Continued)

(56) References Cited

U.S. PATENT DOCUMENTS 6,916,150 B2 * 7/2005 Liang ...................... F01D 5/186
415/115
7,695,248 B2 * 4/2010 Mons ...................... B22F 12/53
219/121.64

(Continued)

FOREIGN PATENT DOCUMENTS

DE 19944923 A1 * 3/2001 ............ F01D 11/122
EP 3865664 A 8/2021
(Continued)

OTHER PUBLICATIONS

Machine Translation of DE19944923 [retrieved on Jul. 11, 2024]. Retrieved from: Espacenet. (Year: 2024).*
(Continued)

*Primary Examiner* — Eric J Zamora Alvarez
(74) *Attorney, Agent, or Firm* — Shook, Hardy & Bacon L.L.P.

(57) ABSTRACT

A flow body for a gas turbine includes an airfoil extending along a radial direction between a platform end and a tip which has a tip surface. The airfoil is formed of a first metal material and comprises an inner cavity for receiving a gaseous cooling fluid. The flow body further includes a squealer tip protruding from the tip surface of the tip and extending along a circumference of the tip so that the squealer tip at least partially surrounds the tip surface. The squealer tip is formed from a second metal material and includes a plurality of internal cooling cavities that are separated from each other within the squealer tip, wherein (Continued)

each of the internal cooling cavities is in fluid communication with the inner cavity via one or more fluid passages.

14 Claims, 5 Drawing Sheets

(51) Int. Cl.
    *B33Y 80/00*       (2015.01)
    *F01D 5/00*        (2006.01)
    *F01D 5/14*        (2006.01)
    *F01D 5/18*        (2006.01)

(52) U.S. Cl.
    CPC ........ *F01D 5/187* (2013.01); *F05D 2230/234* (2013.01); *F05D 2230/31* (2013.01); *F05D 2230/80* (2013.01)

(58) Field of Classification Search
    CPC . F01D 5/141; F01D 5/225; F01D 5/14; F01D 5/181; F01D 5/28; F05D 2240/307; F05D 2260/202; F05D 2220/32; F05D 2260/201; F05D 2230/31; F05D 2230/22; F05D 2230/30; F05D 2230/80; F05D 2260/204; F05D 2230/21; F05D 2240/30; F05D 2230/234; F05D 2240/306; F05D 2230/50; F05D 2230/51; F05D 2230/23; F05D 2230/236; B33Y 80/00; B33Y 10/00
    See application file for complete search history.

(56) References Cited

U.S. PATENT DOCUMENTS

| | | | |
|---|---|---|---|
| 7,704,047 B2 | 4/2010 | Liang et al. | |
| 9,266,170 B2* | 2/2016 | Godfrey | C30B 11/00 |
| 9,297,262 B2* | 3/2016 | Zhang | F01D 5/186 |
| 10,753,207 B2* | 8/2020 | Rathay | F01D 5/186 |
| 11,512,598 B2* | 11/2022 | Rathay | F01D 5/187 |
| 2013/0195673 A1 | 8/2013 | Godfrey et al. | |
| 2013/0236318 A1 | 9/2013 | Prue | |
| 2014/0178207 A1* | 6/2014 | He | F01D 5/20 |
| | | | 416/182 |
| 2016/0265366 A1* | 9/2016 | Snyder | B22F 7/08 |
| 2018/0304371 A1 | 10/2018 | Wiebe et al. | |
| 2019/0032496 A1 | 1/2019 | Kester | |
| 2019/0338650 A1* | 11/2019 | Henderkott | F01D 5/187 |
| 2020/0088043 A1 | 3/2020 | Washko et al. | |
| 2020/0149403 A1 | 5/2020 | Kottilingham et al. | |
| 2021/0299802 A1* | 9/2021 | Shin | B23P 6/007 |
| 2022/0090511 A1* | 3/2022 | Brandl | F01D 5/20 |
| 2022/0290568 A1 | 9/2022 | Poth, III et al. | |
| 2022/0341330 A1 | 10/2022 | Jain et al. | |
| 2023/0127843 A1 | 4/2023 | Anders et al. | |

FOREIGN PATENT DOCUMENTS

| | | |
|---|---|---|
| FR | 3117389 A | 11/2022 |
| JP | 2019039423 A | 3/2019 |
| WO | 2021087503 A1 | 5/2021 |

OTHER PUBLICATIONS

European Search Report, in Corresponding European Application No. 23173138.1-004 Dated Month Sep. 26, 2023.

European Search Report, in Corresponding European Application No. 3575555 Dated Month Sep. 4, 2019.

Office Action Received in Korean Application No. 10-2023-0077384 mailed May 9, 2025. (English Translation Included), 14 pages.

* cited by examiner

FLOW BODY FOR A GAS TURBINE, GAS TURBINE, METHOD FOR MANUFACTURING A FLOW BODY FOR A GAS TURBINE, AND METHOD FOR REPAIRING A FLOW BODY OF A GAS TURBINE

CROSS-REFERENCE TO RELATED APPLICATION(S)

This application claims priority to European Patent Application No(s). 23173138.1, filed on May 12, 2023, the disclosure(s) of which is (are) incorporated herein by reference in its (their) entirety.

BACKGROUND OF THE INVENTION

Field of the Invention

The present invention relates to a flow body for a gas turbine, a gas turbine, a method for manufacturing a flow body for a gas turbine, and a method for repairing a flow body of a gas turbine.

Description of the Related Art

Flow bodies of a gas turbine such as blades and vanes, in particular blades and vanes in a turbine part of the gas turbine, are subject to high thermal loads. Therefore, it is common to cool the blades or vanes by means of a cooling fluid, such as compressed air delivered by a compressor of the gas turbine. The cooling fluid, typically, is conducted to an interior cavity of an airfoil of the blade or vane and, from there, distributed to various cooling channels. The airfoil, typically, is provided with a squealer tip formed at a tip of the airfoil. The squealer tip may be formed substantially as a web that protrudes from the tip of the airfoil and surrounds a tip surface of the airfoil. Thereby, the squealer tip forms a barrier that helps to prevent fluid from flowing from a pressure side to a suction side of the airfoil.

Document U.S. Pat. No. 7,704,047 B2 discloses a turbine blade with a squealer tip, wherein cooling holes extend between an inner cavity of the blade and a suction side surface of a squealer tip rail of the squealer tip with the purpose of creating a cooling fluid film close to the squealer tip rail.

Document EP 3 575 555 A1 describes a turbine blade for a gas turbine that includes an airfoil extending radially from a base to a blade tip. The airfoil includes an internal cooling circuit extending from the base to the blade tip, and a squealer tip. The squealer tip includes a first squealer tip rail and a second squealer tip rail adjacent to the first squealer tip rail and a squealer tip cap extending between the first and second squealer tip rails. The blade tip, the first and second squealer tip rails, and the squealer tip cap define an internal squealer tip cooling channel which is fluidly connected to the internal cooling circuit by apertures in the blade tip. The squealer tip rails are deposited onto the blade tip by an additive manufacturing technique. The squealer tip cap is deposited onto the first and second squealer tip rails by an additive manufacturing technique, too.

SUMMARY

It is one of the objects of the present invention to provide improved solutions for cooling a squealer tip of a flow body, e.g. a blade or vane, of a gas turbine. In particular, it is an object to provide a solution for cooling a squealer tip that requires a reduced amount of cooling fluid and that can be manufactured in an efficient way.

To this end, the present invention provides a flow body, a gas turbine, a method for manufacturing a flow, and a method for repairing a flow body in accordance with the description herein.

According to a first aspect of the invention, a flow body for a gas turbine includes an airfoil extending along a radial direction between a platform end and a tip which has a tip surface. The airfoil is formed of a first metal material and comprises an inner cavity for receiving a gaseous cooling fluid. The flow body further includes a squealer tip protruding from the tip surface of the tip and extending along a circumference of the tip so that the squealer tip at least partially surrounds the tip surface. The squealer tip is formed from a second metal material and includes a plurality of internal cooling cavities that are separated from each other within the squealer tip, wherein each of the internal cooling cavities is in fluid communication with the inner cavity via one or more fluid passages.

According to a second aspect of the invention, a gas turbine includes a flow body according the first aspect of the invention.

According to a third aspect of the invention, a method for manufacturing a flow body for a gas turbine according the first aspect of the invention is provided. The method includes casting the airfoil from the first metal material with the inner cavity, the tip surface and a contact surface that at least partially surrounds the tip surface, forming a plurality of fluid passages between the inner cavity and the contact surface of the tip, and building the squealer tip from the second metal material on the contact surface of the tip by means of an additive manufacturing process, such that the internal cooling cavities are separately formed and such that each of the internal cooling cavities is in fluid communication with the inner cavity via the one or more of the plurality of fluid passages.

According to a fourth aspect of the invention, a method for repairing a flow body of a gas turbine is provided. The flow body to be repaired may be a flow body in accordance with the first aspect of the invention. Generally, the flow body to be repaired includes an airfoil extending along a radial direction between a platform end and a tip which has a tip surface, and a squealer tip protruding from the tip surface and extending along a circumference of the tip so that the squealer tip at least partially surrounds the tip surface. The airfoil to be repaired further includes an inner cavity for receiving a gaseous cooling fluid, and the squealer tip includes a cooling system in fluid communication with the inner cavity of the airfoil via a plurality of fluid passages. The method according to this aspect of the invention includes removing the squealer tip from the airfoil in a subtractive process, such as grinding, milling or similar, forming a contact surface that at least partially surrounds the tip surface of the tip of the airfoil, e.g. by grinding or another subtractive process, and building a new squealer tip on the contact surface of the tip by means of an additive manufacturing process, such that the new squealer tip includes a plurality of internal cooling cavities that are separated from each other within the squealer tip, and such that each of the internal cooling cavities is in fluid communication with the inner cavity via the one or more of the plurality of fluid passages.

It is one of the ideas of the present invention to provide a flow body, e.g. a blade or a vane, in the form of a hybrid part with an airfoil cast from a first metal material and an additively manufactured squealer tip of a second metal material, wherein the squealer tip includes multiple internal cooling cavities that are separated from each other within the squealer tip, e.g. by additively manufactured internal walls of the squealer tip. The airfoil includes an internal cavity or void which is fluidly connected to each of the internal cooling cavities of the squealer tip to supply cooling fluid, such as compressed air, to the internal cooling cavities.

Specifically, the airfoil has a tip surface which extends substantially transverse to the radial direction. The squealer tip protrudes from the tip surface with respect to the radial direction. Hence, the squealer tip may extend along the radial direction or may also extend inclined relative to the radial direction. Generally, the squealer tip extends at least partially along the radial direction. The squealer tip partially or fully surrounds the tip surface. This also includes a configuration, in which the squealer tip as such fully surrounds the tip surface, and wherein only a part of the circumference is formed as additively manufactured squealer tip from the second metal material with multiple internal cooling cavities separated from each other, wherein the rest of the squealer tip is cast or machined from the first metal material.

For manufacturing the flow body, the airfoil is cast first. This includes forming the airfoil to extend between the platform end and the tip end in the radial direction and with the inner cavity. Further, the airfoil is formed to include a contact surface adjacent to and at least partially surrounding the tip surface. Passages that extend between the contact surface and the inner cavity of the airfoil are formed in the casting step and/or in an additional step after casting the airfoil, e.g., by drilling holes in the contact surface. In a further step, the squealer tip is built directly onto the contact surface of the airfoil.

One of the advantages of the invention is that, due to additively manufacturing the squealer tip directly onto the contact surface, multiple separate internal cooling cavities can be generated within the squealer tip with high precision and in various dimensions. In particular, a thin wall thickness of the squealer tip walls can be achieved by using an additive manufacturing process for building the squealer tip. On the one hand, this reduces a temperature difference across the squealer tip walls which leads to reduced mechanical stress and, consequently, to increased lifetime of the squealer tip. On the other hand, a mass flow of the cooling fluid can be reduced which increases efficiency of the turbine.

Further, providing multiple separate internal cooling cavities distributed within the squealer tip allows to realize a cooling scheme which is adapted more precisely to the local heat loads on the squealer tip. Thereby, the mass flow of the cooling fluid can be further optimized.

Further embodiments of the present disclosure are subject of the further subclaims and the following description, referring to the drawings.

According to some embodiments, the first metal material may be a cast metal material. In particular, the first metal material may be a Nickel or Cobalt based high temperature alloy, such as, e.g., IN792SX, CM247LC, or similar.

According to some embodiments, the second metal material may be a metal material deposited in an additive manufacturing process. Generally, the second metal material may be a Nickel or Cobalt based high temperature alloy suitable for additive manufacturing, such as Haynes 230, Hastelloy-X, IN625, or CM247.

According to some embodiments, the internal cooling cavities of the squealer tip may be spaced from each other along the circumference of the tip. Since the local heat load may vary remarkably along the circumference of the tip, providing multiple separate internal cooling cavities within the squealer tip allows for a further optimized adaption of the cooling to the local heat loads.

According to some embodiments, the plurality of internal cooling cavities includes a first set of the cavities and a second set of cavities that are spaced in the radial direction and/or along the circumference of the tip surface, wherein each cavity of the first set of cavities is in fluid communication with the inner cavity of the airfoil via at least one first fluid passage and with one cavity of the second set of cavities being adjacent in the radial direction or along the circumference of the tip surface via at least one second fluid passage. Hence, the internal cooling cavities of the first set are separated from each other, and the internal cooling cavities of the first set are separated from each other, too. However, one cavity of the first set is in fluid communication with one or more cavities of the second set. The internal cooling cavities of the first set are positioned closer to the tip of the airfoil than the internal cooling cavities of the second set, when they are spaced in the radial direction. Cooling fluid is supplied from the inner cavity of the airfoil to the internal cooling cavities of the first set first and, from there, is supplied to the internal cooling cavities of the second set. Thereby, the cooling fluid not only removes heat within one cavity but in at least two cavities which are spaced in the radial direction. Hence, a more efficient use of the cooling fluid is achieved, and, in total, a higher amount of heat can be removed from the squealer tip. It should be appreciated that also more than two sets of cavities may be present. Generally, each set includes at least one internal cooling cavity.

According to some embodiments, the one or more fluid passages connecting at least some of the internal cooling cavities of the squealer tip to the inner cavity of the airfoil may be formed as cooling holes that are inclined such that a central axis of the respective cooling hole intersects a lateral inner surface of the respective internal cooling cavity. Hence, when cooling fluid from the inner cavity of the airfoil is supplied to the respective internal cavity of the squealer tip, the cooling fluid impinges on the inner surface of the internal cooling cavity. Thereby, an impingement cooling can be realized in some or all of the internal cooling cavities which further promotes heat transfer between the cooling fluid and the walls of the squealer tip. In the case of first and second sets of internal cooling cavities in the squealer tip, as described above, it may also be provided that at least one of the first and the second fluid passages is inclined such that a central axis of the respective cooling hole intersects a lateral inner surface of the respective internal cooling cavity of the first and/or the second set of cooling cavities.

According to some embodiments, a hydraulic diameter of at least some of the internal cooling cavities of the squealer tip decreases with increasing distance from the tip of the airfoil. In particular, an inner diameter or a cross-sectional area may decrease. For example, an exhaust passage that connects the internal cooling cavity of the squealer tip with the environment or, more precisely, with an outer surface of the squealer tip may be provided in an end portion of the squealer tip that faces away from tip of the airfoil. Hence, the cooling fluid entering the internal cooling cavity of the squealer tip, due to the decreasing diameter, is accelerated within the internal cooling cavity towards the exhaust passage. Thereby, not only an improved heat transfer is achieved but also a narrowing geometry of the squealer tip can be provided with a substantially constant wall thickness.

According to some embodiments, at least some of the internal cooling cavities of the squealer tip may include at least one of projections and recesses formed on an inner surface limiting the respective internal cooling cavities. For example, ribs and/or grooves may be formed within the internal cooling cavities. Thereby, heat transfer can be further promoted. Additionally, additively manufacturing of the squealer tip allows forming the projections and recesses in a precise and efficient manufacturing process which is less limited by manufacturing tolerances, i.e., compared to casting.

According to some embodiments, the airfoil may comprise a suction side surface and a pressure side surface which meet at a leading edge and a trailing edge, respectively. According to some further embodiments, the squealer tip may protrude over at least one of the suction side surface and the pressure side surface. For example, there may be formed a continuous transition between an outer surface of the squealer tip and the suction side surface and/or the pressure side surface, wherein the transition is formed by a concave curved surface portion. Generally, the squealer tip may extend inclined relative to the respective pressure or suction side surface. Thereby, an aerodynamically advantageous squealer tip can be realized. Since the squealer tip with its internal cooling cavities is formed by additive manufacturing the squealer tip can be realized aerodynamically advantageous in a precise and efficient manufacturing process.

According to some embodiments, the squealer tip may be material bonded to a contact surface of the tip of the airfoil by an additively manufactured transition layer that connects the contact surface and a main portion of the squealer tip, the contact surface at least partially surrounding the tip surface of the tip, wherein the transition layer, compared to at least one of the main portion of the squealer tip and the airfoil, may have at least one of a reduced stiffness and an increased ductility in combination with reduced yield strength. Due to different physical properties and structural conditions of the first and second metal materials of the airfoil and the squealer tip, such as, for example, coefficient of thermal expansion (CTE), Young's modulus, metallic crystal structure and so on, an interface between the first metal material of the airfoil and the second metal material of the squealer tip may be prone to high mechanical stress in some situations. By providing a transition layer, in which stiffness is reduced and/or ductility is increased and yield strength is reduced compared to at least one of the two adjacent material regions, a less abrupt transition between the material properties of the first metal material to the transition layer and from the second metal material to the transition layer is achieved. Thereby, mechanical stress can be reduced in the transition region between the airfoil and the squealer tip. The transition layer is deposited directly onto the contact surface of the tip of the airfoil and, therefore, has a certain thickness. Hence, the transition layer may be seen as a part of the squealer tip. In other words, the squealer tip may comprise a main portion formed of the second metal material and the transition layer that positive substance joins or material bonds the main portion of the squealer tip to the tip of the airfoil.

According to some embodiments, the transition layer may be made of the second metal material, wherein a porosity of the second metal material may be increased or higher within the transition layer compared to the main portion of the squealier tip. For example, the transition layer may be formed in the additive manufacturing process by varying the parameters of the additive manufacturing process to form the transition layer with higher porosity, i.e., with pores of greater dimensions. Optionally, the porosity may vary within the transition layer between the contact surface of the tip of the airfoil and the main portion of the squealer tip. For example, the porosity may decrease or increase within the transition layer from the contact surface of the tip of the airfoil towards the main portion of the squealer tip. Alternatively, the porosity, from the contact surface of the tip towards the main portion of the squealer tip, may increase and again decrease. Due to the increased porosity in the transition layer, the stiffness of the transition layer is reduced which helps in lowering the mechanical stress. Additively manufacturing the transition layer provides the advantage that the porosity of the transition layer can be adapted easily to the mechanical needs.

According to some embodiments, the transition layer may also be made of a third metal material comprising an increased ductility and reduced yield strength compared to the first and the second metal material. For example, the third metal material may be Haynes230, Hastelloy-X, IN617, or similar. The third metal material can be deposited in the additive manufacturing process on the contact surface of the tip of the airfoil. Also in this way, the mechanical stress can be lowered in the transition layer in an improved manner. The third metal material, thus, has a reduced yield strength than the first and the second metal material. Further, the third metal material may have a CTE within the same range than the first and the second metal material.

According to some embodiments, the transition layer may have a thickness in a range between 0.1 mm and 5.0 mm, in particular, between 0.5 mm and 2.0 mm.

According to some embodiments, the gas turbine may comprise a compressor configured to compress a working fluid, a burner receiving compressed working fluid from the compressor and configured to burn a fuel to heat the working fluid, and a turbine including the turbine blade assembly, wherein the turbine stage is configured to expand the working fluid causing the turbine blade assembly to rotate. Hence, the blade assembly may form part of the turbine. As a working fluid, the compressor may suck air from the environment, and the compressed air may be used for combustion of the fuel in the combustor or burner. As a fuel, liquid fuel, such as kerosene, diesel, ethanol, or similar may be used. Alternatively, gaseous fuel such as natural gas, fermentation gas, hydrogen, or similar can be used.

According to some embodiments, the flow body forms a rotating blade or a stator vane. As a rotating blade, the flow body may be coupled, for example, to a rotating disk of the gas turbine. As a stationary vane, the flow body may be coupled, for example, to a stator frame of the gas turbine.

According to some embodiments, the contact surface of the tip of the airfoil, to which the squealer tip is joined, may extend inclined relative to the tip surface. In particular, the contact surface may extend inclined also with respect to the suction side surface and/or with respect to the pressure side surface so that the contact surface forms a transition between the suction or pressure side surface and the tip surface. In other words, the contact surface may extend inclined and non-perpendicular to the radial direction. The inclined configuration of the contact surface eases forming the fluid passages between the contact surface and the inner cavity of the airfoil. For example, the fluid passages may extend substantially perpendicular to the contact surface. This is advantageous with regard to forming them in the casting process or by drilling.

According to some embodiments, the additive manufacturing process of building the squealer tip may include selective laser melting (SLM) or selective laser sintering (SLS), direct metal deposition (DMD), or electron beam welding.

According to some embodiments, casting the airfoil may include a conventionally cast (CC), a directionally solidified (DS), or single crystal (SX) cast process.

The features and advantages described herein with respect to one aspect of the invention are also disclosed for the other aspects and vice versa.

With respect to directions and axes, in particular, with respect to directions and axes concerning the extension or expanse of physical structures, within the scope of the present invention, an extent of an axis, a direction, or a structure "along" another axis, direction, or structure includes that said axes, directions, or structures, in particular tangents which result at a particular site of the respective structure, enclose an angle which is smaller than 45 degrees, preferably smaller than 30 degrees and in particular preferable extend parallel to each other.

With respect to directions and axes, in particular with respect to directions and axes concerning the extension or expanse of physical structures, within the scope of the present invention, an extent of an axis, a direction, or a structure "crossways", "across", "cross", or "transversal" to another axis, direction, or structure includes in particular that said axes, directions, or structures, in particular tangents which result at a particular site of the respective structure, enclose an angle which is greater or equal than 45 degrees, preferably greater or equal than 60 degrees, and in particular preferable extend perpendicular to each other.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments, which are specified in the schematic figures of the drawings, in which.

In the figures like reference signs denote like elements unless stated otherwise.

DETAILED DESCRIPTION

Figure 1:
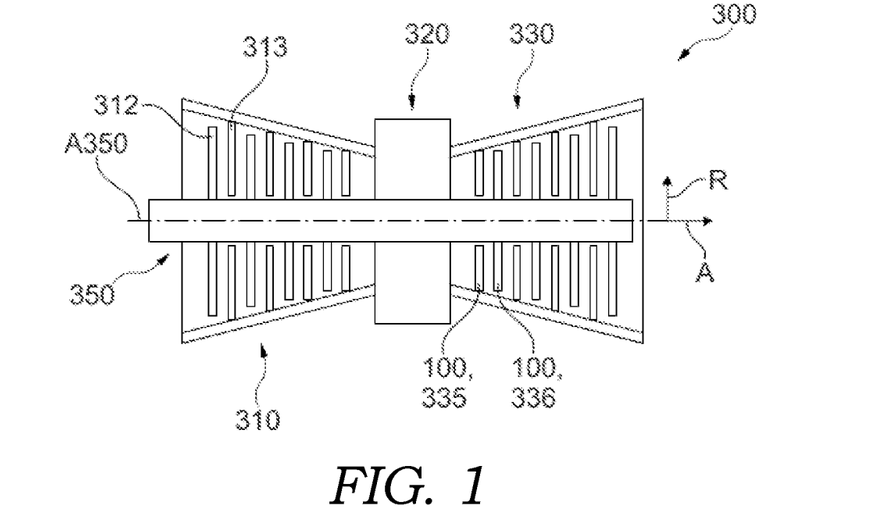
FIG. 1 schematically illustrates a cross-sectional view of a gas turbine according to an embodiment of the invention.

FIG. 1 schematically shows a gas turbine 300. The gas turbine 300 includes a compressor 310, a burner or combustor 320, and a turbine 330. The turbine 330 and the compressor 310 may be mechanically integrated to form a rotor 350 which is rotatable about a common rotational axis A350.

The compressor 310 of the gas turbine 300 may draw air as a working fluid from the environment and compress the drawn air. The compressor 310 may be realized as centrifugal compressor or an axial compressor. FIG. 1 exemplarily shows a multistage axial compressor which is configured for high mass flows of air. The axial compressor may include multiple rotor disks, each carrying a plurality of blades. The rotor disks (not shown) are coupled to each other so as to be rotatable together about the rotational axis A350. Compressor vanes 313 are arranged downstream of the blades 312. The blades 312 compress the introduced air and deliver the compressed air to the compressor vanes 313 disposed adjacently downstream. The plurality of compressor vanes 313 guide the compressed air flowing from compressor blades 312 disposed upstream to compressor blades 312 disposed at a following, downstream stage. The air is compressed gradually to a high pressure while passing through the stages of compressor blades 312 and vanes 313.

The compressed air is supplied to the combustor 320 for combustion of a fuel, such as natural gas, hydrogen, diesel, kerosene, ethanol or similar. Further, a part of the compressed air is supplied as a gaseous cooling fluid to high-temperature regions of the gas turbine 300 for cooling purposes. The burner or combustor 320, by use of the compressed air, burns fuel to heat the compressed air.

As schematically shown in FIG. 1, the turbine 330 includes a plurality of blade assemblies, each comprising a rotor disk to which a plurality of turbine blades 336 are coupled. The turbine 330 further includes a plurality of turbine vanes 335. Generally, the rotor disks are coupled to each other so as to be rotatable together about the rotational axis A350. For example, the rotor disks of the turbine and the rotor disks of the compressor may be fastened together by means of a central element such as a bolt to form the rotor 350. The turbine blades 336 are coupled to the respective rotor disk and extend radially therefrom. The turbine vanes 335 are positioned upstream of the blades 336 of the respective rotor disks 210. The turbine vanes 335 are fixed in a stator frame so that they do not rotate about the rotational axis and guide the flow of combustion gas coming from the burner 320 passing through the turbine blades 336. The combustion gas is expanded in the turbine 330 and gas applies a force to the turbine blades 336 which causes the rotor 350 to rotate about the rotational axis A350. The compressor 310 may be driven by a portion of the power output from the turbine 330.

Generally, a blade 312 or 336 and a vane 313, 335 of the gas turbine 300 are referred to in the following as flow body 100.

Figure 2:
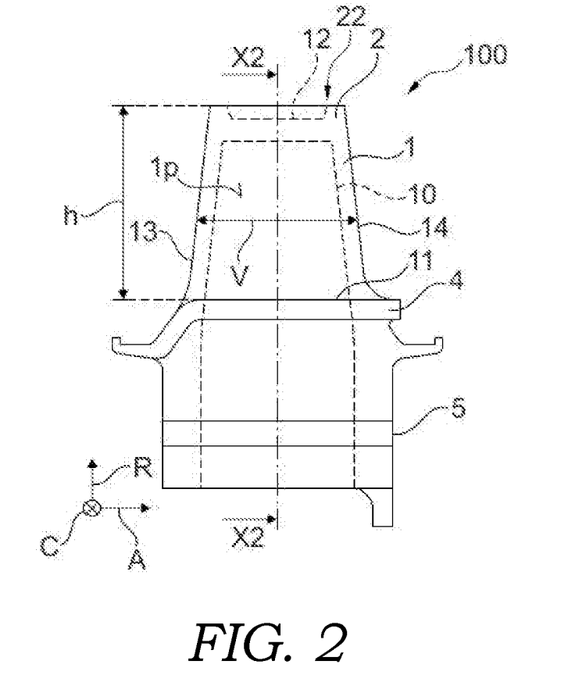
FIG. 2 schematically illustrates a side view of a flow body according to an embodiment of the invention.
Figure 3:
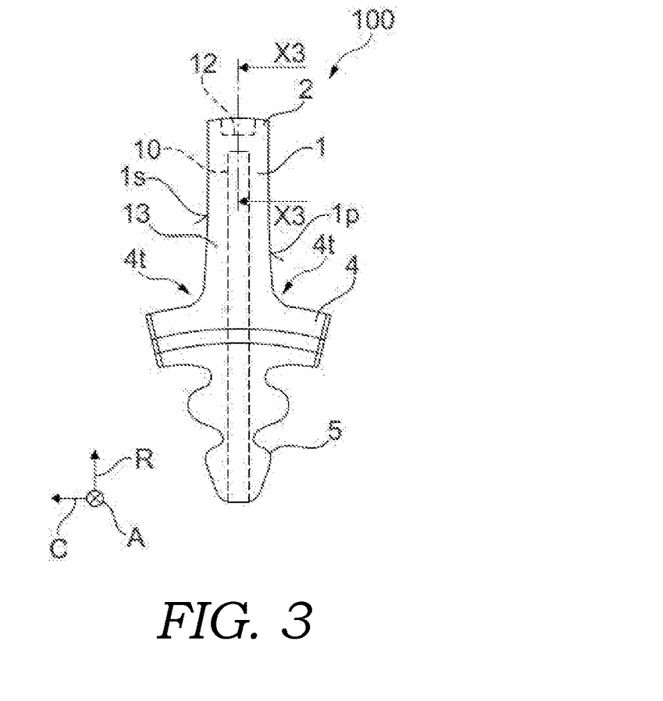
FIG. 3 schematically illustrates a front view towards a leading edge of the flow body of FIG. 2.
Figure 4:
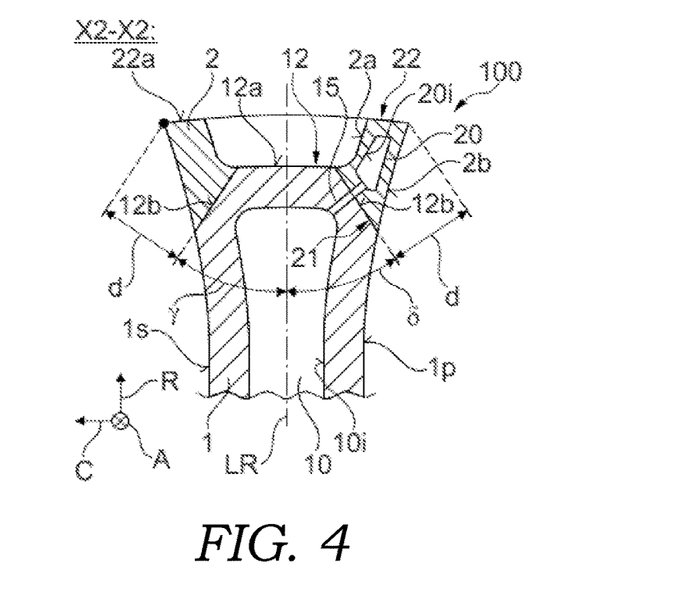
FIG. 4 schematically illustrates a partial cross-sectional view of the flow body of FIG. 2 taken along line X2-X2 shown in FIG. 2.
Figures 5, 6:
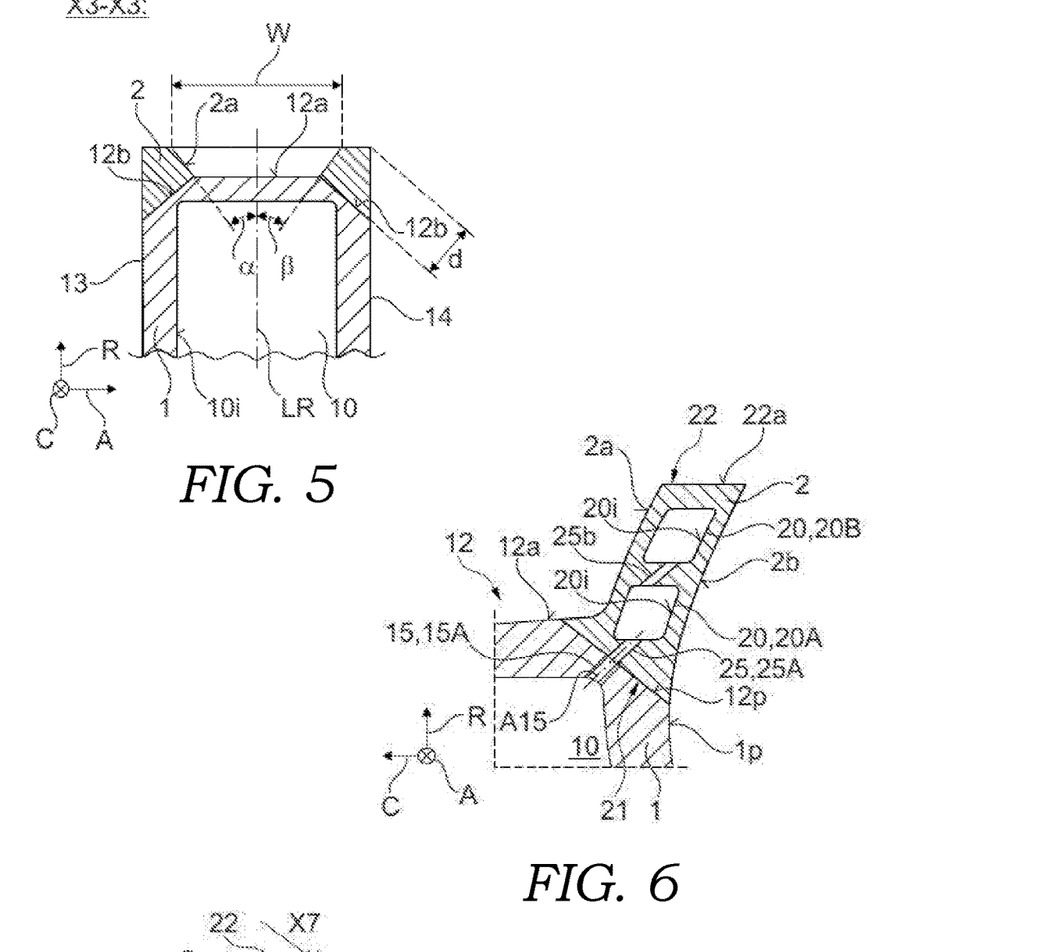
FIG. 5 schematically illustrates a partial cross-sectional view of the flow body of FIG. 2 taken along line X3-X3 shown in FIG. 3.
FIG. 6 schematically illustrates a partial cross-sectional view of a flow body in the region of the tip of an airfoil and a squealer tip according to an embodiment of the invention.

FIG. 2 exemplarily and schematically shows a flow body 100 in the form of a turbine blade 336. However, the invention is not limited to a blade 336 of a turbine part 330 but may also be employed in a vane of the turbine part 330, or a blade 312 or a vane 313 of the compressor part 313. FIG. 3 shows a front view of the flow body of FIG. 2. FIGS. 4 and 5 show partial sectional views of the flow body 100.

As shown in FIGS. 2 and 3, the flow body 100 includes an airfoil 1 and a squealer tip 2, and, optionally, may further include a platform 4, and a root 5.

The airfoil 1 extends along radial or span direction R between a platform end 11 and a tip 12. With regard to an axial or chord direction A, that extends transverse to the radial direction, the airfoil 1 may extend between a leading edge 13 and a trailing edge 14. An outer surface of the airfoil 1, between the leading edge 13 and the trailing edge 14, may define a pressure side surface 1p and a suction side surface 1s being oriented opposite to the pressure side surface 1p. The pressure side surface 1p and the suction side surface 1s meet at the leading edge 13 and at the trailing edge 14.

As schematically shown in FIGS. 2 and 3, the platform 4 may be a substantially plate shaped structure having an expanse with respect to the axial direction A and with respect to a circumferential direction C. The circumferential direction C extends transverse to the axial direction A and to the radial direction R. The platform 4 is coupled to the platform end 11 of the airfoil 1 and may protrude from the airfoil 1 with respect to the circumferential direction C.

The outer surface 1a of the airfoil 1, in particular, the pressure side surface 1p and the suction side surface 1s, each may be connected to an upper surface of the platform 4 via a transition surface 4t. As exemplarily shown in FIG. 3, the transition surface 4t may be a concave curved surface.

The root 5 is connected to the platform 4, in particular, to a lower surface of the platform 4 and protrudes from the lower surface of the platform 4 along the radial direction R. As exemplarily shown in FIG. 3, the root 5 may include a fir tree shaped cross-section. Generally, coupling interfaces of the rotor disk or coupling interfaces of the stator frame of the gas turbine 300 and the roots 5 of the flow bodies 100 may have complementary cross-sections.

As shown in FIGS. 2 and 3 in dashed lines and as further visible in the cross-sectional views of FIGS. 4 and 5, the flow body 100, in particular, the airfoil 1, comprises an inner cavity or void 10. The inner cavity 10 is limited by an inner surface 10i of flow body 100 and serves as a reservoir for receiving a gaseous cooling fluid, e.g., compressed air bleed from the compressor 310. As shown in FIGS. 2 and 3, the inner cavity 10 may extend within the airfoil 1 from the platform end 11 towards the tip 12 and, optionally, may also extend through the root 5 of the flow body 100.

As visible best in FIGS. 4 and 5, the tip 12 of the airfoil 1 has a tip surface 12a. The tip surface 12a extends transverse to the radial direction R and forms part of an outer surface of the airfoil 1. As shown in FIGS. 4 and 5, the tip surface 12a may be planar or substantially planar. However, the tip surface 12a may also be curved, e.g. with a concave or convex curvature. The tip surface 12a is surrounded along its circumference, at least partially, by a contact surface 12b. The contact surface 12b may be planar or substantially planar, as exemplarily shown in FIGS. 4 and 5. However, the contact surface 12b may also be curved, e.g. with a concave or convex curvature. The contact surface 12b may extend inclined relative to the tip surface 12a and, optionally, also with respect to the pressure side surface 1p and the suction side surface 1s. Generally, the contact surface 12b may be inclined relative to the radial direction, e.g. by an angle within a range between 30 degrees and 120 degrees, in particular, between 60 degrees and 95 degrees. As schematically shown in FIG. 4, a first surface angle γ between the contact surface 12b on the side of the suction side surface 1s and a center line LR of the airfoil 1 parallel to the radial direction R may be in a range between 60 degrees and 95 degrees. As further shown in FIG. 4, a second surface angle δ between the contact surface 12b on the side of the pressure side surface 1p and the line LR parallel to the radial direction R may be in a range between 60 degrees and 95 degrees. The first and second surface angles γ, δ may be equal to each other but they may also be different from each other. Further, it should be noted that the first and second surface angles γ, δ may vary along the circumference of the tip surface 12a.

As further shown in FIG. 4, a fluid passage 15, which may, for example, be formed as a drilled hole or a cast passage, extends between the inner cavity 10 of the airfoil 1 and the contact surface 12b of the tip 12 so that a gaseous fluid, such as compressed air, can be discharged from the inner cavity 10 through the fluid passage 15. Although FIG. 4 only shows one fluid passage 15, a plurality of fluid passages 15 are distributed along the circumference of the tip surface 12a and extend between the contact surface 12b and the inner cavity 10.

The airfoil 1, the platform 4, and the root 5 may be integrally formed from a first metal material. In particular, the first metal material may be a cast metal material. For example, the first metal material may be a Nickel or Cobalt based high temperature alloy such as, for example, IN792SX, CM247LC, or similar.

The squealer tip 2 is material joined to the tip 12 of the airfoil 1, in particular, to the contact surface 12b of the tip 12. As visible, for example, in FIGS. 4 and 5, the squealer tip 2 extends between a first end 21 and a second end 22 opposite to the first end 21. The first end 21 is joined to the contact surface 12b of the tip 12 of the airfoil 1. The second end 22 may comprise an end face 22a, facing away from the tip 12 of the airfoil 1. Between the first 21 and the second end 22, the squealer tip 2 may extend at least partially along the radial direction R. Generally, the squealer tip 2 protrudes from the tip surface 12a with respect to the radial direction. The squealer tip 2 may have a first lateral surface 2a facing towards the tip surface 12a of the tip 12, and a second lateral surface 2b being oriented opposite to the first lateral surface 12a. As shown in FIG. 4, the second lateral surface 2b may form a continuous surface with the outer surface of the airfoil 1, in particular, with the suction side surface 1s and the pressure side surface 1p.

Optionally, the squealer tip 2 may protrude over at least one of the suction side surface 1s and a pressure side surface 1p, in particular, with respect to the circumferential direction C, as exemplarily shown in FIGS. 4, 6, 7, 10, and 11. In this case, the second end 22 of the squealer tip 2 is spaced to the first end 21 of the squealer tip 2 in the circumferential direction C.

Further optionally, as schematically shown in FIGS. 4, 6, 7, 10, and 11, the second lateral surface 2b and the respective pressure side surface 1p or suction side surface 1s may be concave curved in a transition region from the second lateral surface 2b to the respective pressure side surface 1p or suction side surface 1s.

Figure 10:
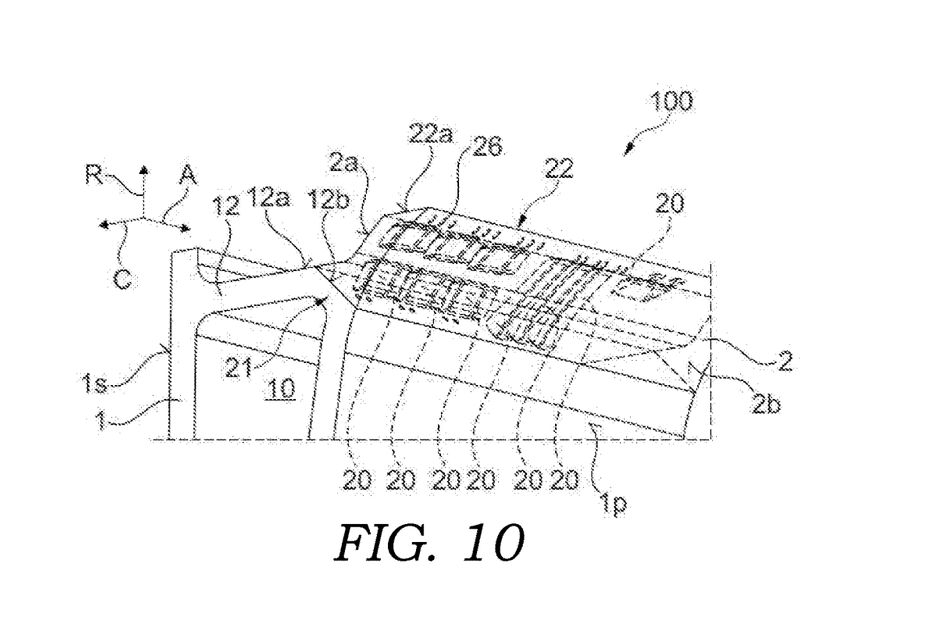
FIG. 10 illustrates a perspective view of a partial cross-sectional representation of a flow body according to a further embodiment of the invention.
Figure 11:
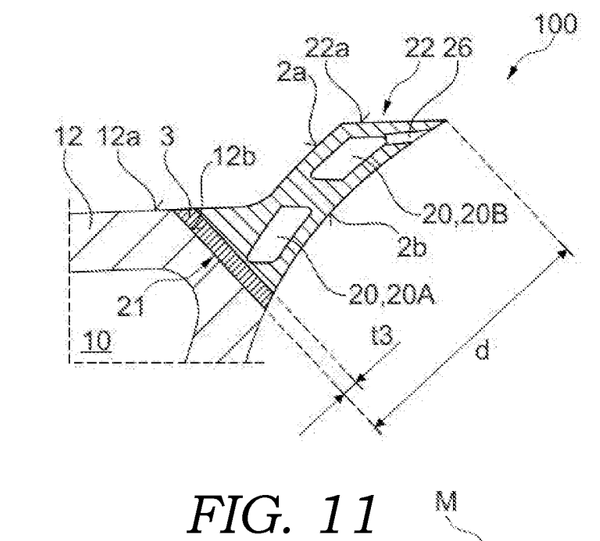
FIG. 11 schematically illustrates a partial cross-sectional view of a flow body in the region of the tip of an airfoil and a squealer tip according to an embodiment of the invention.

Generally, the first lateral surface 2a may extend substantially parallel to the second lateral surface 2b of the squealer tip 2, as exemplarily shown in FIGS. 6, 10, and 11. However, the invention is not limited thereto. For example, a distance between the first and second lateral surfaces 2a, 2b of the squealer tip 2 may also decrease towards the second end 22 of the squealer tip 2, so that a wedge shaped or narrowing cross-section may be realized, as exemplarily and schematically shown in FIG. 7.

The squealer tip 2 may be formed along the total circumference of the airfoil 1, i.e., on both the pressure side and the suction side over the total length between the leading edge 13 and the trailing edge 14, or only about a part of the circumference. Generally, the squealer tip 2 extends along a circumference of the tip 12 so that the squealer tip 2 at least partially surrounds the tip surface 12a.

As schematically illustrated in FIG. 4, the squealer tip 2 may have a predefined squealer tip height d, measured perpendicular to the contact surface 12b. The airfoil 1 and the squealer tip 2 may have a total height h, wherein the total height h is measured from the platform end 11 of the airfoil 1 to the second end 22 of the squealer tip 2 in the radial direction R, as schematically illustrated in FIG. 2. The squealer tip height d may be smaller than or equal to 15% of the total height h.

An axial squealer tip width W which is a shortest distance measured in the axial direction A through the center line LR between opposite portions of the second end 22 of the squealer tip 2 is further depicted in FIG. 5. The airfoil 1, at a radial position corresponding to the half distance between the platform end 11 and the second end 22 of the squealer tip 2 has an axial airfoil width V measured in the axial direction A between the leading edge 13 and the trailing edge 14. The axial squealer tip width W may be in a range between 50% and 130% of the axial airfoil width V. An angle between the center line LR of the airfoil 1 and the first lateral surface 2a of the squealer tip 2 may be in a range between 0 degrees and 90 degrees. For example, a first inner angle α between the first lateral surface 2a and the center line LR, at a position corresponding to the leading edge 13 may be in a range between 0 degrees and 90 degrees. A second inner angle β between the first lateral surface 2a and the center line LR, at a position corresponding to the trailing edge 13 may be in a range between 0 degrees and 90 degrees, as depicted schematically in FIG. 5. The first and the second inner angle α, β may be equal to each other or different from each other.

As shown schematically in FIG. 4, the squealer tip 2 includes an internal cooling cavity 20 which is limited by an inner surface 20i of the squealer tip 2. A distance between the inner surface 20i and an adjacent one of the lateral surfaces 2a, 2b of the squealer tip 2 or between end face 22a and the adjacent portion of the inner surface 20i defines a wall thickness of a squealer tip wall separating the internal cooling cavity 20 from the environment. FIG. 4, for the purpose of explanation, only shows one cooling cavity 20. However, the squealer tip 2 includes a plurality of internal cooling cavities 20 that are separated from each other. For example, the cooling cavities 20 may be separated and spaced from each other along the circumference of the tip surface 12a as exemplarily shown in FIG. 10. Additionally or alternatively, the internal cooling cavities 20 may be separated and spaced along the radial direction R or, more specifically, in a direction from the first to the second end 21, 22 of the squealer tip 2, as exemplarily shown in FIGS. 6 and 10. It should be noted that separate internal cooling cavities 20, optionally, may be in fluid communication via one or more cooling passages, wherein a hydraulic diameter of those fluid passages is small compared to the hydraulic diameter of the cavities 20 connected by those passages. For example, the hydraulic diameter of a passage connecting two separate internal cavities 20 may be in a range of 1% to 25%, in particular, between 1% and 10% of the hydraulic diameter of the smaller one of the two separate internal cavities 20.

As schematically shown in FIGS. 4, 6, 7, and 11 each of the separated internal cooling cavities 20 is in fluid communication with the inner cavity 10 via one or more of the plurality of fluid passages 15. To this end, the cooling passage 15 formed in the tip 12 of the airfoil 1 may directly open into the internal cooling cavity 20 of the squealer tip 2, or the squealer tip 2 itself may include a cooling passage 25 opening into the internal cooling cavity 20 and being connected to the cooling passage 15 of the tip 2 so that they form a continuous fluid passage connecting the internal cooling cavity 20 to the inner cavity 10 of the airfoil 1. Thus, a gaseous cooling fluid such as compressed air can be supplied from the inner cavity 10 of the airfoil 1 to a plurality of separate internal cooling cavities 20 in the squealer tip 2 via separate cooling passages 15, 25. Therefore, the squealer tip 2 can be cooled more efficiently and the cooling capacity can be adapted more precisely to the local heat loads applied to the squealer tip 2.

Referring to FIG. 6, and as already mentioned above, it may be provided, that multiple internal cooling cavities 20 are spaced to one another within the squealer tip 2 with respect to the radial direction R or with respect to the direction from the first to the second end 21, 22 of the squealer tip 2. FIG. 6 exemplarily shows a configuration with a first internal cooling cavity 20 positioned adjacent to the first end 21 of the squealer tip 2 and connected to the inner cavity 10 of the airfoil 1 via a first cooling passage 15A, 25A, and with a second internal cooling cavity 20 positioned spaced to the first internal cooling cavity 20 towards the second end 22 of the squealer tip 2 and connected to the first internal cooling cavity 20 of the squealer tip 2 via a second cooling passage 25B. Optionally, the second internal cooling cavity 20 may be connected to the environment, e.g., to a main gas flow around the flow body 100, via an exhaust passage (not shown in FIG. 6) that may, for example, open to the second lateral surface 2b of the squealer tip 2. FIG. 6 exemplarily shows a first and a second internal cooling cavity adjacent to each other with respect to the radial direction R. It should be noted that there might be more than two internal cooling cavities spaced to each other in the radial direction R within the squealer tip 2. Additionally, or alternatively, multiple first and second internal cooling cavities 20 spaced in the radial direction R may be distributed along the circumference of the tip 12, as schematically shown in FIG. 10. Generally, the plurality of internal cooling cavities 20 may include a first set 20A of the cavities 20 and a second set 20B of cavities 20 that are spaced in the radial direction R and/or along the circumference of the tip surface 12a, wherein each cavity of the first set 20A of cavities 20 is in fluid communication with the inner cavity 10 of the airfoil 1 via at least one first fluid passage 15A and with one cavity 20 of the second set 20B of cavities 20 being adjacent in the radial direction R or along the circumference of the tip surface 12a via at least one second fluid passage 25B.

As is further illustrated in FIG. 6, the fluid passage 15A, 25A connecting the internal cavity 20 of the first set 20A to the inner cavity 10 of the airfoil 10 may be formed as a cooling hole that is inclined such that a central axis A15 of the respective cooling hole intersects the inner surface 20i adjacent to the second lateral surface 2b of the squealer tip 2. Thereby, the cooling fluid discharged from the inner cavity 10 of the airfoil 1 to the cooling cavity 20 of the squealer tip 2 impinges onto the inner surface 20i which further promotes heat transfer. As visible in FIG. 6, also the second fluid passage 25B can be realized inclined such that its central axis (not depicted in FIG. 6) intersects the inner surface 20i adjacent to the second lateral surface 2b of the squealer tip 2. It should be noted that this configuration of the cooling passages 15A, 25A is not limited to a squealer tip 2 with a first and a second cooling cavity 20 spaced in the radial direction R. Rather, it may generally be provided that at least some of the cooling passages 15, 25 that connect at least some of the internal cooling cavities 20 of the squealer tip 2 to the inner cavity 10 of the airfoil 1 are formed as cooling holes that are inclined such that the central axis A15 of the respective cooling hole intersects a lateral inner surface 20i of the respective internal cooling cavity 20.

Figure 7:
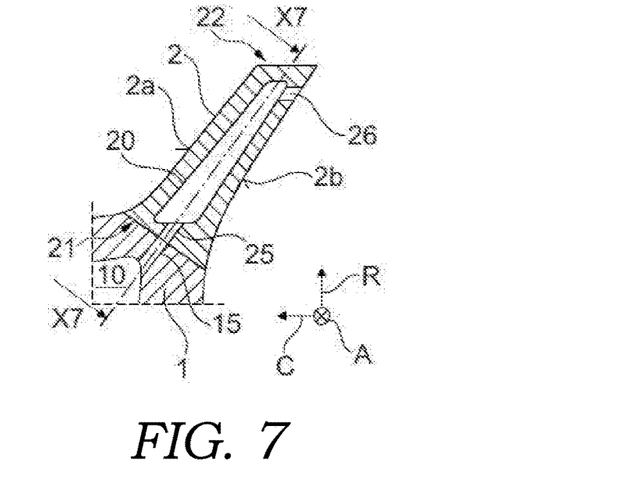
FIG. 7 schematically illustrates a partial cross-sectional view of a flow body in the region of the tip of an airfoil and a squealer tip according to a further embodiment of the invention.
Figure 8:
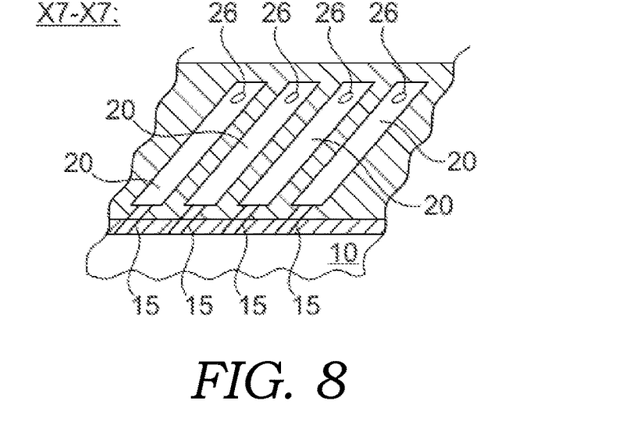
FIG. 8 shows a schematic cross-sectional view of the squealer tip of the flow body of FIG. 7 taken along line X7-X7 in FIG. 7.

FIG. 7 exemplarily shows a squealer tip 2 in which an inner diameter of at least some of the internal cooling cavities 20 of the squealer tip 2 decreases with increasing distance from the tip 12 of the airfoil 1. In the example of FIG. 7, the internal cooling cavity 20 extends as a continuous channel from a region adjacent to the first end 21 to a region adjacent to the second end 22 of the squealer tip 2, wherein an effective flow area of the channel decreases towards the second end 22. As is further exemplarily shown in FIG. 7, the fluid passage 15, 25 that connects the internal cooling cavity 20 to the inner cavity 10 of the airfoil 1 may extend along, i.e., parallel, to a longitudinal axis of the internal cooling cavity 20. However, the invention is not limited to this configuration. For example, the fluid passage 15, 25 may also extend inclined relative to the inner surface 20i of the internal cooling cavity 2 as described above with reference to FIG. 6. FIG. 7, by way of example, shows an exhaust passage 26 that extends between the second lateral surface 2b of the squealer tip 2 and the internal cooling cavity 20 so that the cooling fluid can be exhaust or discharge from cooling cavity 20 through the exhaust passage 26. Not only in the example of FIG. 7 but generally, the exhaust passage 26 may be positioned adjacent to the second end 22 of the squealer tip 2. As visible in FIG. 8, which is a cross-sectional view of the squealer tip 2 of FIG. 2, multiple internal cooling cavities 20, in this example in the form of continuous channels, may be arranged separated and spaced from one another along the circumference of the tip 12.

Figure 9:
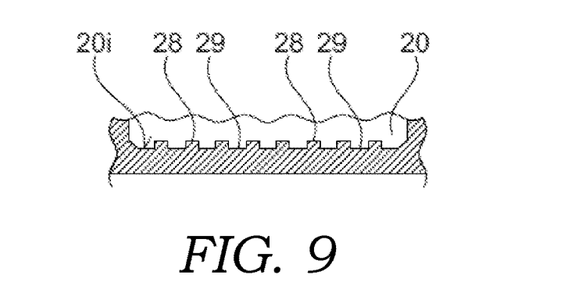
FIG. 9 schematically illustrates a partial cross-sectional view of an internal cooling cavity of a squealer tip of a flow body according to an embodiment of the invention.

In the schematical FIGS. 4 and 6 to 8, the inner surface 20i of the internal cooling cavities 2 have been shown as smooth surface. Optionally, at least some of the internal cooling cavities 20 of the squealer tip 2 may include at least one of projections 28, e.g., in the form of ribs, and recesses 29, e.g., in the form of grooves, formed on the inner surface 20i, as exemplarily and schematically shown in FIG. 9.

The squealer tip 2 is made of a second metal material, in particular, by a metal material deposited in an additive manufacturing process. For example, the second metal material may be a Nickel or Cobalt based high temperature alloy suitable for additive manufacturing, such as Haynes 230, Hastelloy-X, IN625, or CM247. As will be explained in more detail below with reference to FIG. 12, the squealer tip 2 is built in an additive manufacturing process directly onto the contact surface 12b of the tip 12 of the airfoil 1. Thereby, the squealer tip 2 is material joined to the tip 12. One advantage of this configuration is that additive manufacturing technology allows for realizing complex geometries of the squealer tip 2, including aerodynamically advantageous outer shapes defined by the first and second lateral surface 2a, 2b and the end face 22a of the squealer tip 2. On the other hand, additive manufacturing the squealer tip 2 allows forming internal cooling cavities 20 even in a complex shaped squealer tip 2. In particular, multiple separated internal cooling cavities 20, as described above, can efficiently be manufactured to improve cooling performance within the squealer tip 2.

FIG. 11 schematically shows a cross-sectional view of the flow body 100 in the region of the tip 12 of the airfoil 1. As schematically shown, the squealer tip 2 may be material bonded to the contact surface 12b of the tip 12 of the airfoil 12 by an additively manufactured transition layer 3. The transition layer 3 forms part of the squealer tip 2 as it is additively manufactured, optionally, in the same process of building the squealer tip 2. The main portion of the squealer tip 2 may be defined as a portion of the squealer tip 2 which extends between the transition layer 3 and the second end 22 and in which the physical properties of the second metal material are substantially constant. Since the airfoil 1 and the squealer tip 2 are made from different materials and are manufactured in different processes, physical properties of the materials of the airfoil 1 and the squealer tip 2 are different on either side of an interface, e.g., the contact surface 12b, between the airfoil 1 and the squealer tip 2. The transition layer 3 serves for reducing mechanical stress in the transition region of the airfoil 1 and the squealer tip 2 by lowering stress within the transition layer 3. Therefore, the transition layer 3, compared to at least one of the main portion of the squealer tip 2 and the airfoil 1, has at least one of a reduced stiffness and an increased ductility in combination with a reduced yield strength.

The transition layer 3, for example, may also be made of the second metal material from which the main portion of the squealer tip 2 is made. In this case, the second metal material has a greater porosity in the transition layer 3 than in the main portion of the squealer tip 2. In other words, a porosity of the second metal material is increased within the transition layer 3 compared to the main portion of the squealer tip 2. Thereby, the stiffness of the transition layer 3 is reduced compared to the main portion of the squealer tip 2 which helps in lowering mechanical stress within the transition layer 3.

The porosity $P_3$ of the transition layer 3 may be quantified by equation (1) below $$P_3 = 1 - \frac{\rho_3}{\rho_2} \qquad (1)$$

in which $\rho_3$ is an average volume density of the second metal material within the transition layer 3 and $\rho_2$ is an average volume density of the second metal material within the main portion of the squealer tip 2. $P_3$, for example, may be smaller or equal than 0.5, in particular, smaller or equal than 0.2. For example, $P_3$ may be in a range between 0.02 to 0.05.

Alternatively, the transition layer 3 may be made of a third metal material comprising an increased ductility and reduced yield strength compared to the first and the second metal material. For example, the third metal material may be deposited on the contact surface 12b in a first step of additively manufacturing the squealer tip 2 to form the transition layer 3, and the second material may be deposited onto the transition layer 3 in a further step of the additive manufacturing process. For example, the third metal material may be Haynes230, Hastelloy-X, IN617, or similar.

Irrespective of whether porosity is increased in the transition layer 3 or whether the transition layer 3 is made of a third metal material, it may have a thickness t3, measured perpendicular to the contact surface 12*b*, in a range between 0.1 mm and 5.0 mm, in particular between 0.5 mm and 2.0 mm. Generally, the thickness t3 of the transition layer 3 may be smaller or equal than 35% of the squealer tip height d.

Figure 12:
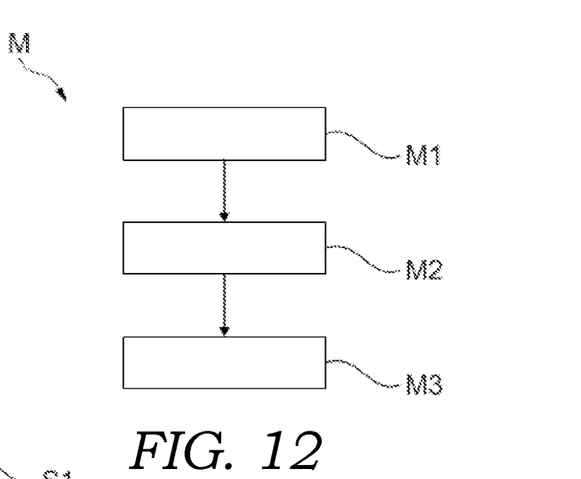
FIG. 12 illustrates a flowchart of a method for manufacturing a flow body of a turbine according to an embodiment of the invention.

FIG. 12 shows a flowchart of a method M for manufacturing a flow body 100 for a gas turbine 300. The method M will be explained below by reference to the flow bodies 100 described above.

In a first step M1, the airfoil 1 is cast from the first metal material. This may, for example, include a conventionally cast (CC), a directionally solidified (DS), or a single crystal (SX) cast process. In the casting step M1, the inner cavity 10, the tip surface 12*a* and the contact surface 12*b* are formed as well as the pressure and suction side surfaces 1*p*, 1*s*. Optionally, also the platform 4 and the root 5 are formed in the casting step M1.

In step M2, the plurality of fluid passages 15 is formed between the inner cavity 10 and the contact surface 12*b* of the tip 12. This step M2 may include drilling, electrical discharge machining, or similar subtractive processes. Alternatively, step M2 may form part of step M1, in that the passages 15 are formed in the casting process.

Step M3 includes building the squealer tip 2 from the second metal material on the contact surface 12*b* of the tip 12 by means of an additive manufacturing process. The additive manufacturing process may include, for example, selective laser melting (SLM), direct metal deposition (DMD), or electron beam welding (EBW). In step M3, the outer shape of the squealer tip 2 defined by the first and second lateral surfaces 2*a*, 2*b* and the end face 22*a* is built as well as the internal cooling cavities 20. In particular, the squealer tip 2 is built such that the internal cooling cavities 20 are separately formed and such that each of the internal cooling cavities 20 is in fluid communication with the inner cavity 10 via the one or more of the plurality of fluid passages 15, 25.

Step M3 may also include building the optional transition layer 3 by an additive manufacturing process. The additive manufacturing process for building the optional transition layer 3 may be the same as the one for building the remaining squealer tip 2, e.g., SLM, DMD, or EBW. The transition layer 3, as explained above, may be formed from the same second metal material as the main portion of the squealer tip 2 and may have an increased porosity compared to the main portion. In the additive manufacturing process, an increased porosity may be achieved, for example, by depositing and melting the second metal material spot wise with wider pitches between the individual spots than in the main portion. For example, in an SLM process, in a layer of metal powder, not all of the metal powder may be melted and subsequently solidified. Thereby, spots with non-melted powder remain within the layer that form pores. Alternatively, the third metal material may be deposited on the contact surface 12*b* in step M3 to build the transition layer 3, and the main portion of the squealer tip 2 is built on the transition layer in the second metal material.

Optionally, the contact surface 12*b* may be subject to a surface treatment step (not shown in the flowchart of FIG. 12), in which the contact surface 12*b* is prepared for depositing the second or third metal material thereon in the subsequent step M3 of building the squealer tip 2. The surface treatment step may, for example, include a subtractive process such as grinding to vary or adapt the surface roughness and/or to orientation of the contact surface 12*b*.

As already discussed above, the additive manufacturing of the squealer tip 2 directly onto the tip 12 provides various benefits. For example, the thickness of the walls of the squealer tip 2 that limit the internal cooling cavities 20 may be reduced. Consequently, a temperature difference across the wall is reduced which, in turn, reduced mechanical stress in the wall. Thereby, lifetime of the squealer tip can be increased. Further, less cooling fluid is required which helps to increase the efficiency of the gas turbine 300. Moreover, additive manufacturing is less sensitive to manufacturing tolerances and provides a high freedom of design for the squealer tip 2. For example, the mass of the squealer tip 2 can be easily adapted to engine frequencies and mode shapes. The high freedom of design achieved by the additive manufacturing process finally allows to realize greater aerodynamic improvements than it would be possible with conventional methods, since any shape, that can be made by additive methods, can be also cooled efficiently.

Figure 13:
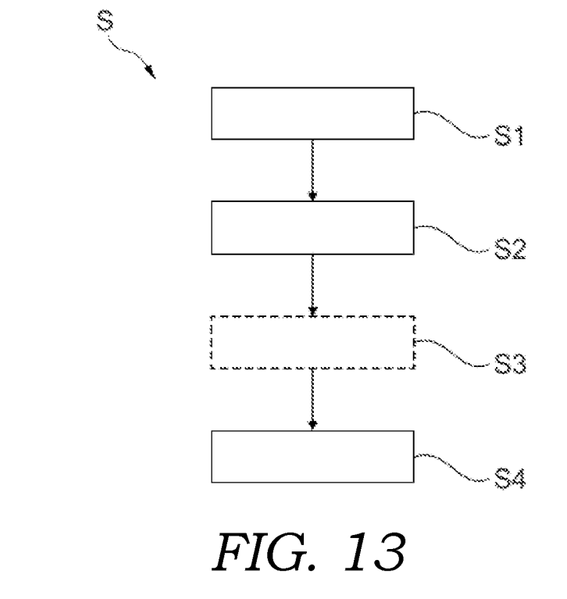
FIG. 13 illustrates a flowchart of a method for repairing a flow body of a turbine according to an embodiment of the invention.

Moreover, the present invention provides an improved solution for repairing a flow body 100 of a gas turbine 300, e.g. a blade or a vane. FIG. 13 schematically shows a flowchart of a method S for repairing a flow body 100 of a gas turbine 300. The method M may be applied to the flow body 100 described above. However, the method is not limited thereto. Generally, the method S may be applied to any flow body 100 comprising an airfoil 1 extending along a radial direction R between a platform end 11 and a tip 12 which has a tip surface 12*a*, a squealer tip 2 that protrudes from the tip surface 12*a* and extends along a circumference of the tip 12 so that the squealer tip 2 at least partially surrounds the tip surface 12*a*, and an inner cavity 10 for receiving a gaseous cooling fluid. The squealer tip 2 of the flow body 100 to be repaired further includes a cooling system in fluid communication with the inner cavity 10 of the airfoil (1) via a plurality of fluid passages 15. The cooling system, generally, may include one or more cooling channels that are in fluid communication with the inner cavity 10 of the airfoil 1 via the fluid passages 15.

As shown in FIG. 13, the method S a step S1, in which the squealer tip 2 is removed from the airfoil 1 in a subtractive process such as grinding, milling or similar.

In step S2, a contact surface 12*b* that at least partially surrounds the tip surface 12*a* of the tip 12 of the airfoil 1 is formed. Step S2 may form part of step S1 insofar as the subtractive process of step S1 may also be used to form the contact surface 12*b*. The contact surface 12*b* may in particular be formed in one of the configurations described above, e.g., by reference to FIG. 4.

In an optional step S3, additional fluid passages 15 may be formed between the contact surface 12*b* and the inner cavity 10 of the airfoil 1, e.g., by drilling or another subtractive process. Additionally, or alternatively, the existing fluid passages 15 may be cleaned or widened in step S3.

In step S4, a new squealer tip 2 is built on the contact surface 12*b* of the tip 12 by means of an additive manufacturing process such as SLM, DMD, EBW, or similar. The new squealer tip 2 may, for example, be built from the second metal material as described above. Generally, the new squealer tip 2 may be built in step S3 in the same process as in step M3 of method M described by reference to FIG. 12.

The repair method S, hence, provides an efficient process for improving the cooling efficiency of a squealer tip 2 of existing flow bodies 100 in an overhaul process.

In both, the repair method S and the manufacturing method M, a further optional step may be performed after step M3 and S4, respectively. In this further optional step, one or more coating layers (not shown) may be applied to the outer surface of the flow body 100, e.g., to the pressure and suction side surfaces 1p, 1s and the tip surface 12a of the airfoil 1, and the outer surfaces 2a, 2b, 22a of the squealer tip 2. For example, a MCrAlY material or other suitable material as bond coat may be applied by a low pressure plasma spray (LPPS), an air plasma spray (APS), a vacuum plasma spray (VPS), or high velocity oxy fuel (HVOF) process. The letter "M" in "MCrAlY" is a placeholder for Co, Ni, or NiCo. Additionally, a topcoat may be applied to the coating. For example, a single or multi-layered ceramic, e.g., Yttrium stabilized zirconium (YSZ), may be applied by LPPS or APS.

Further optionally, in both, the repair method S and the manufacturing method M, an additional step (not shown in the flowcharts of FIGS. 12 and 13) may be carried out after building the squealer tip 2. In this additional step, the outer surface of the airfoil 1, e.g. the pressure and the suction side surface 1p, 1s, and the outer surface of the squealer tip 2, e.g., the second lateral surface 2b of the squealer tip 2 may be treated to remove steps between their outer surfaces. E.g., a transition area between the second lateral surface 2b of the squealer tip 2 and the respective pressure and the suction side surface 1p, 1s may be subject to a subtractive process, such as grinding or similar, to remove possible level differences and form a continuous surface.

Although specific embodiments have been illustrated and described herein, it will be appreciated by those of at least ordinary skill in the art that a variety of alternate and/or equivalent implementations exist. It should be appreciated that the exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

LIST OF REFERENCE SIGNS 1 airfoil
1p pressure side surface
1s suction side surface
2 squealer tip
2a first lateral surface of squealer tip
2b second lateral surface of squealer tip
3 transition layer
4 platform
4t transition surface
5 root
10 inner cavity of airfoil
11 platform end of airfoil
12 tip end of airfoil
12a tip surface
12b contact surface
13 leading edge of airfoil
14 trailing edge of airfoil
15, 25 fluid passage
15A, 25A first fluid passage
20 internal cooling cavity of squealer tip
20A first set of internal cooling cavities
20B second set of internal cooling cavities
20i inner surface of internal cooling cavity
21 first end of squealer tip
22 second end of squealer tip
22a end face of squealer tip
25B second fluid passage
26 exhaust passage
28 projection
29 recess
100 flow body
300 gas turbine
310 compressor
312 compressor blade
313 compressor vane
320 burner
330 turbine
335 turbine vane
336 turbine blade
350 rotor
A axial direction
C circumferential direction
d squealer tip height
h total height of airfoil and squealer tip
M manufacturing method
M1-M3 method steps of the manufacturing method
LR center line
S repair method
S1-S4 method steps of the repair method
R radial direction
V axial airfoil width
W axial squealer tip width
Z radial height
α first inner angle
β second inner angle
γ first surface angle
δ second surface angle

The invention claimed is:

1. A flow body for a gas turbine, comprising:
an airfoil extending along a radial direction between a platform end and a tip which has a tip surface, the airfoil being formed of a first metal material and comprising an inner cavity for receiving a gaseous cooling fluid; and
a squealer tip protruding from the tip surface of the tip and extending along a circumference of the tip so that the squealer tip at least partially surrounds the tip surface, wherein the squealer tip is formed from a second metal material and includes a plurality of internal cooling cavities that are separated from each other within the squealer tip, each of the internal cooling cavities being in fluid communication with the inner cavity via one or more fluid passages;
wherein the squealer tip is material bonded to a contact surface of the tip of the airfoil by an additively manufactured transition layer that connects the contact surface and a main portion of the squealer tip, the contact surface at least partially surrounding the tip surface of the tip, wherein the transition layer, compared to at least one of the main portion of the squealer tip and the airfoil, has at least one of (a) an increased ductility in combination with a reduced yield strength and (b) a reduced stiffness.

2. The flow body of claim 1, wherein the first metal material is a cast metal material.

3. The flow body of claim 1, wherein the second metal material is a metal material deposited in an additive manufacturing process.

4. The flow body of claim 3, wherein the plurality of internal cooling cavities of the squealer tip are spaced from each other along the circumference of the tip.

5. The flow body of claim 4, wherein the plurality of internal cooling cavities includes a first set of the cavities and a second set of cavities that are spaced in the radial direction and/or along the circumference of the tip surface, wherein each cavity of the first set of cavities is in fluid communication with the inner cavity of the airfoil via at least one first fluid passage and with one cavity of the second set of cavities being adjacent in the radial direction or along the circumference of the tip surface via at least one second fluid passage.

6. The flow body of claim 4, wherein at least one of the fluid passages connecting at least one of the internal cooling cavities of the squealer tip to the inner cavity of the airfoil is formed as a cooling hole that is inclined such that a central axis of the cooling hole intersects a lateral inner surface of the internal cooling cavity.

7. The flow body of claim 6, wherein a hydraulic diameter of at least one of the internal cooling cavities of the squealer tip decreases with increasing distance from the tip of the airfoil.

8. The flow body of claim 7, wherein at least one of the internal cooling cavities of the squealer tip include at least one of projections and recesses formed on an inner surface limiting the respective internal cooling cavities.

9. A gas turbine comprising the flow body of claim 1.

10. The gas turbine of claim 9, wherein the flow body forms a rotating blade or a stator vane.

11. A method for manufacturing the flow body for the gas turbine according to claim 1, the method comprising:
casting the airfoil from the first metal material with the inner cavity, the tip surface and the contact surface that at least partially surrounds the tip surface;
forming the one or more fluid passages between the inner cavity and the contact surface of the tip; and
building the squealer tip from the second metal material on the contact surface of the tip by means of an additive manufacturing process, such that the internal cooling cavities are separately formed and such that each of the internal cooling cavities is in fluid communication with the inner cavity via the one or more fluid passages.

12. The method of claim 11, wherein the contact surface extends inclined relative to the tip surface.

13. The method of claim 11, wherein the additive manufacturing process of building the squealer tip includes selective laser melting, direct metal deposition, or electron beam welding.

14. A flow body for a gas turbine, comprising:
an airfoil extending along a radial direction between a platform end and a tip which has a tip surface, the airfoil being formed of a first metal material and comprising an inner cavity for receiving a gaseous cooling fluid; and
a squealer tip protruding from the tip surface of the tip and extending along a circumference of the tip so that the squealer tip at least partially surrounds the tip surface, wherein the squealer tip is formed from a second metal material and includes a plurality of internal cooling cavities that are separated from each other within the squealer tip, each of the internal cooling cavities being in fluid communication with the inner cavity via one or more fluid passages;
wherein:
the second metal material is a metal material deposited in an additive manufacturing process;
the plurality of internal cooling cavities of the squealer tip are spaced from each other along the circumference of the tip;
at least one of the fluid passages connecting at least one of the internal cooling cavities of the squealer tip to the inner cavity of the airfoil is formed as a cooling hole that is inclined such that a central axis of the cooling hole intersects a lateral inner surface of the at least one internal cooling cavity; and
the squealer tip is material bonded to a contact surface of the tip of the airfoil by an additively manufactured transition layer that connects the contact surface and a main portion of the squealer tip, the contact surface at least partially surrounding the tip surface of the tip, wherein the transition layer, compared to at least one of the main portion of the squealer tip and the airfoil, has at least one of (a) an increased ductility in combination with a reduced yield strength and (b) a reduced stiffness.

* * * * *